June 28, 1927.

A. A. KRAMER 1,633,642

TANK FOR DISPENSING LIQUIDS

Filed June 9, 1922

INVENTOR
Andrew A. Kramer.
BY
ATTORNEY

Patented June 28, 1927.

1,633,642

UNITED STATES PATENT OFFICE.

ANDREW A. KRAMER, OF KANSAS CITY, MISSOURI.

TANK FOR DISPENSING LIQUIDS.

Application filed June 9, 1922. Serial No. 567,150.

This invention relates to tank faucets. The primary object of the invention is to provide a safety faucet for dispensing oils from tanks.

Tank wagons are usually divided into a plurality of compartments, from which dispensing pipes lead. The ends of the dispensing pipes are provided with faucets usually having valves which are manually operated so that the faucet passageways can be opened to allow the liquid to flow from the compartmental tank into the receptacle provided to receive it.

Sometimes the valves leak or the liquid issuing from the faucets takes fire. It has been customary to provide separate cut-off valves in the tank compartments which will close the orifices which constitute the connections between the outlets for the compartments of the tank and the inlets for the dispensing pipes; the valves, being located at the bottom of the tank compartments, must be operated by trip-offs at the top of the wagon or tank where they are not readily accessible.

I have provided means whereby the pipe line from the compartment to the faucet will be normally closed by a separate valve distinct from the faucet valve, the tendency of the valve being to normally move into closing position and to be opened only when the faucet valve is open. Therefore, there will be an independent check against the flow of the oil from the pipe line which will maintain the pipe line closed under normal conditions but will open only when the faucet valve is moved into open position. Therefore, even though the faucet valve leaks, the safety valve will prevent flow of the oil from the pipe line and whenever the faucet valve is moved to closing position, whether it actually seats or not, the safety valve will close off the pipe line. Therefore, liability of fires occurring will be reduced to a minimum.

I have also provided a disruptible connection between the valve casing for the faucet and the valve casing for the safety valve so that in the event of rear end collisions, should the faucet become broken off, the safety valve will still maintain the dispensing pipe or pipe line closed.

The novel construction of my invention will be apparent by reference to the following description in connection with the accompanying drawings, in which—

Figure 1:
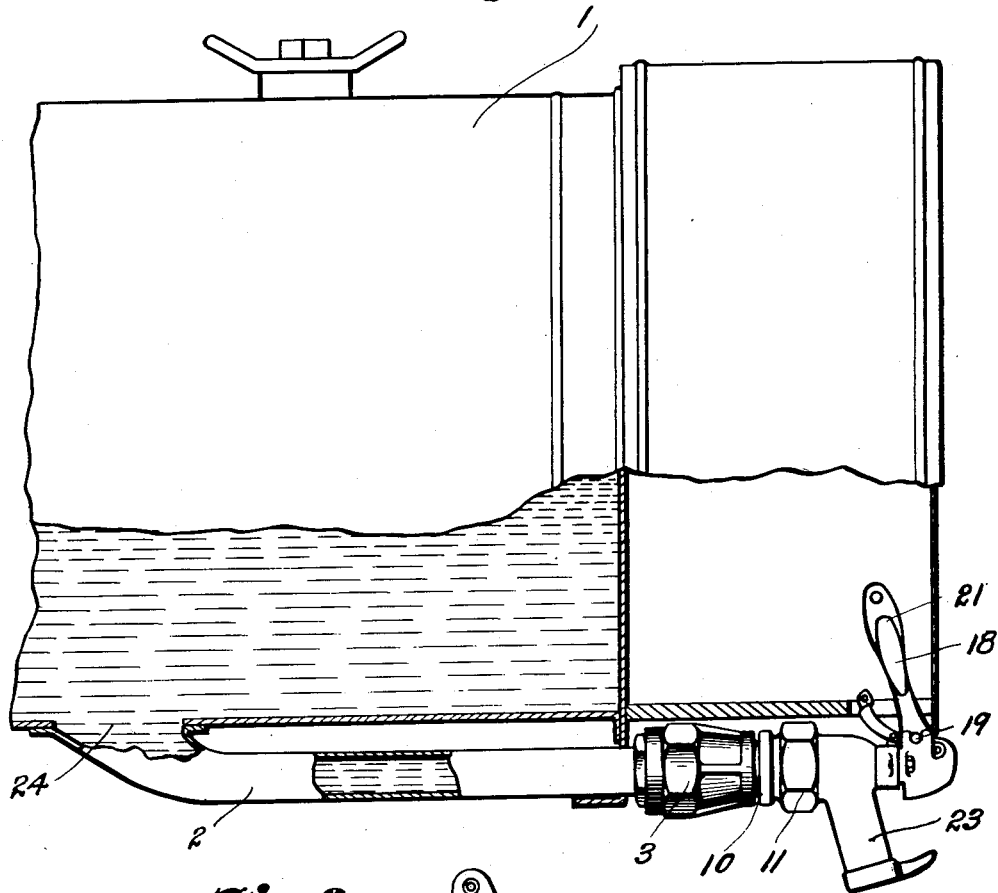
Fig. 1 is a fragmentary view of a tank partly in section and partly in elevation, showing the pipe line partly in elevation and partly in section with the faucet and the safety valve casing in elevation.

The wagon tank 1 may be of any appropriate design or construction and leading therefrom is a pipe line or dispensing pipe 2; the outer end of which is connected to a safety valve casing 3 having a valve seat 4, against which will normally seat a valve 5. The valve 5 is provided with a stem 6 which projects through a spider 7 and carries a collar 8, against which one end of a coil spring 9 bears, the other end of the spring bearing against the spider 7.

Connected to the safety valve casing 3 by a disruptible nipple 10 is a faucet casing 11, which may be of conventional design. The ends of the casings 3 and 11 are spaced apart so that in the event that an end-on blow is received by the faucet, for example, in a collision, the nipple may absorb the shock and even though it becomes broken, the valve 4 may remain upon its seat to close the pipe line 2.

Figure 2:
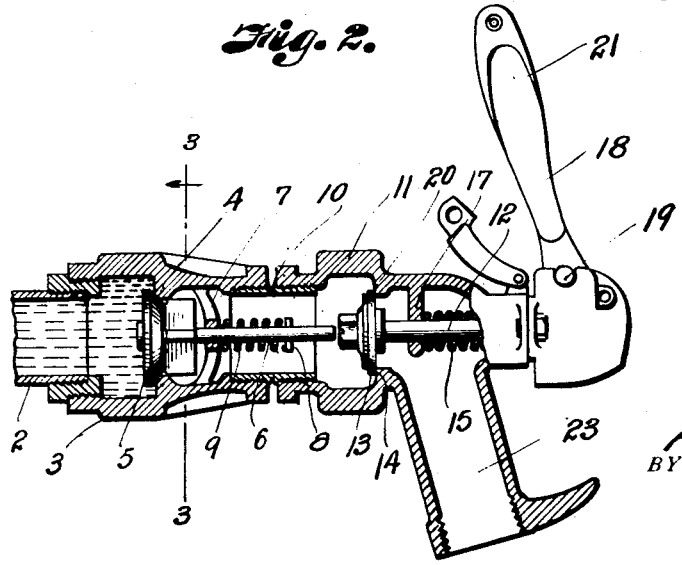
Fig. 2 is a vertical, longitudinal, sectional view through one end of the pipe line, through the safety valve casing, and through part of the faucet, part of the faucet being shown in elevation.
Figure 3:
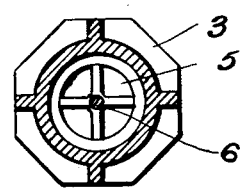
Fig. 3 is a cross sectional view on the line 3—3 of Fig. 2.

Mounted within the faucet casing 11 and in line with the stem 6 is a faucet valve stem 12, carrying a valve 13, which will be urged on its seat 14 by a spring 15, which bears against the guide 17 at one end and which bears against a collar (not shown) on the stem 12. Therefore, there will be a normal tendency for the valve 13 to be seated. An operating lever 18 pivoted at 19 may be swung on its pivot to force the valve 13 off its seat. It will be noted that the end of the stem 12 or rather the nut 20 on the end thereof is in line with the stem 6. Therefore, when the stem 12 is shifted from right to left (see Fig. 2) it will contact with the stem 6 so as to move the valve 5 off its seat. Hence, while the valve 13 is manually moved off its seat, the valve 5 will be off its seat. This will be during the time that the handle 21 of the lever 18 is swung to the right of the position shown in Fig. 2.

The valve 5 will remain off its seat only so long as there is longitudinal pressure exerted on the stem 6 sufficient to unseat the valve 5.

If the operator lets go of the handle 21, the spring 15 will cause the valve 13 to seat, moving the end or nut 20 away from the end of the stem 6 so that the spring 9 may close the valve 5. Therefore, even though the valve 13 leaks, the pipe line will be closed to the nozzle 23 of the faucet, thereby reducing the liability of dripping of the faucet and in the event that the faucet needs to be removed for inspection and repairs, it can be unscrewed from its nipple 10 with which it has threaded connection without permitting the flow of the oil through the pipe 2 because there is always a closing tendency imparted to the valve 5 by the spring 9.

What I claim and desire to secure by Letters Patent is:

1. The combination with a tank for dispensing liquids, of a conduit leading therefrom, a valve seat within the conduit, a valve coacting with the seat, a spring acting on the valve to move it toward its seat in the direction of flow of liquid through the conduit said spring encircling, a stem projecting from the valve in the direction of flow of the liquid through the conduit, a faucet on the end of the conduit, a valve therein and a handle for moving the last named valve from its seat and for engaging the said stem and moving its valve against the flow of liquid through the conduit away from its seat, the said conduit being weakened at a point between the said valves to locate a break in the conduit.

2. The combination with a tank for dispensing liquids having a conduit leading therefrom, of a valve structure for controlling the flow of liquid through the conduit, comprising a member secured to the end of said conduit having a valve seat and a co-acting valve therein normally in closed position, a faucet having a valve seat and a co-acting valve therein normally in closed position, a handle for operating the said valves, and a relatively weak section of conduit entirely independent of the said valves and valve seats connecting the said member and the said faucet, to locate a break in the parts whereby the operativeness of the valves will not be destroyed by the break.

In testimony whereof I affix my signature.

ANDREW A. KRAMER.